Feb. 2, 1943.  H. BURRELL  2,310,010
NITROLIGNIN MOLDING COMPOSITION AND PROCESS OF MAKING SAME
Filed March 16, 1939
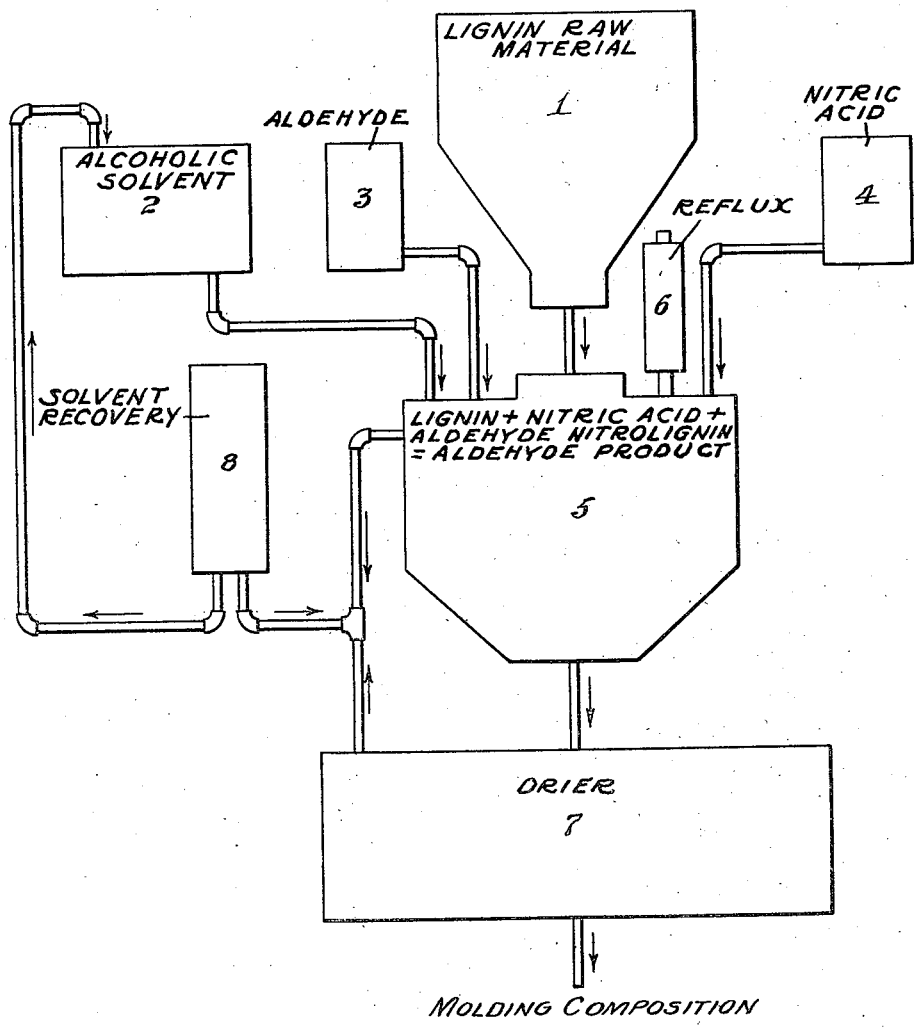
INVENTOR
Harry Burrell
BY Frank B. Root
ATTORNEY Patented Feb. 2, 1943

2,310,010

UNITED STATES PATENT OFFICE 2,310,010

NITROLIGNIN MOLDING COMPOSITION AND PROCESS OF MAKING SAME

Harry Burrell, Newark, N. J., assignor to Ellis-Foster Company, a corporation of New Jersey Application March 16, 1939, Serial No. 262,231

15 Claims. (Cl. 260—9)

This invention relates to the nitration products of lignin, to the aldehyde condensation products of nitrolignin, and to new and useful molding compositions obtained therefrom.

Nitric acid is known to react with lignin to produce a substance containing nitrogen, presumably in the form of nitro or isonitroso groups, called "nitrolignin." The exact molecular make-up of lignin being unknown, the nitrolignin is also of undetermined structural configuration, but in this specification nitrolignin may be taken to mean simply the product resulting from the nitration of lignin.

The reaction between nitric acid and lignin occurs readily with dilute or concentrated acid in aqueous or organic solvent media both at room temperature and at elevated temperatures. The nature of the product varies, however, depending on the conditions of nitration. In addition to the introduction of nitrogen into the lignin, a certain amount of oxidation takes place resulting in decomposition and oxidized products of lignin. This is especially prevalent in aqueous solutions. Nitrolignin may be formed in situ in the vegetable matter in which lignin is naturally present.

Nitrolignin itself is a thermoplastic substance, and may be molded by heat and pressure followed by chilling of the die. I have also found that nitrolignin reacts with aldehydes to produce substances which are thermosetting.

Hence, an object of this invention is to provide a cheap molding composition which may be either thermoplastic or thermosetting.

Another object is to utilize substances heretofore wasted, such as sawdust, bark, lignin from pulping liquors, and other trade wastes derived from the lumber or pulp and paper industries.

The drawing is a diagrammatic representation of the various steps in carrying out the invention.

A raw material storage bin having a suitable hopper is shown at 1. 2 is a solvent (e. g., alcohol) storage tank, 3 an aldehyde storage tank, and 4 a tank for nitric acid. Bin 1 and storage tanks 2, 3 and 4 are connected by suitable means with a reaction kettle 5 which is steam jacketed or fitted with coils (not shown) for heating and provided with suitable stirring means (not shown), as well as with a reflux condenser 6. The reaction kettle 5 connects with a drier 7. A solvent recovery system is included as shown at 8. This system takes alcohol fumes from the kettle 5, condenses the vapor and returns the liquid to solvent storage 2. It is understood that suitable valves (not shown) are positioned in the connecting means of all parts of the apparatus in order to control conveyance of material from one part of the plant to another. The dried product from drier 7 is a molding composition.

In a convenient mode of operation a ligneous raw material is dropped from bin 1 into the reaction kettle 5. Alcohol is run in from tank 2 and, if a thermosetting material is to be prepared, aldehyde from tank 3 is also added either at this or a later stage. With mechanical stirring the nitric acid is introduced from tank 4, measured amounts of all materials being used. The contents of the kettle are allowed to react under heat, alcohol vapors being condensed by condenser 6 or, preferably in the latter stages of reaction, by 8. The reacted and preferably partially de-solvated mixture is then conveyed into the drier 7 where the solvent and other volatile materials are substantially completely removed, whereupon the material is ready for hot-molding into molded articles after being suitably conditioned by known treatments, such as by grinding and by adding pigments or fillers, etc., as desired.

Raw materials suitable for use in the present process comprise lignin from hardwoods, softwoods, or grasses, and ligneous materials such as the natural woods or grasses themselves, preferably in a comminuted condition such as sawdust, bark or other waste, seed hulls, products containing ground wood such as newsprint, or pulping liquors or lignin products derived therefrom. With respect to the last source, lignin such as derived from the sulfate process cooking liquor or from the newer nitric acid pulping processes are especially advantageous.

In carrying out the nitration of lignin, a preferred embodiment of the invention is to use alcoholic media; for example, the nitric acid may be diluted with methanol, ethanol, or mixed pentanols. Organic esters, ethers or carboxylic acids may also be used. In certain cases, aqueous nitric acid may be used if desired; or again, special precautions may be taken to insure anhydrous conditions. The nitric acid may be augmented by sulfuric acid.

The time, temperature, and concentration of acid are dependent on the type of lignin to be treated and the use to which the product is to be put. At room temperature it may require from several hours to two days with 15% ethanol solution of 69% nitric acid to nitrate birch sawdust for a molding composition. At refluxing temperature of the solution, the time may be from 5 minutes to an hour or more. Decreasing concentrations of nitric acid increase the time factor somewhat. The amount of 69% nitric acid per unit of air-dried wood (containing lignin) is preferably no more than equal parts. The nitric acid may be supplied in concentrations from about 1% to 33% or more in alcohol solution.

If nitrolignin plastic is desired, it is necessary only to remove excess nitric acid and alcohol by evaporation and drying. The product may be molded as such or further reacted with an aldehyde such as furfural. The aldehyde addition reaction may be carried out in several ways. For example, by placing the nitrolignin or nitrolignin-containing material, produced by nitration and drying, in contact with a solution of furfural, formaldehyde, or other aldehyde, preferably in alcohol solution, for a sufficient length of time, followed by evaporation of the solvent; or, by carrying out the alcoholic nitration step followed by addition of and reaction with the aldehyde without intermediate removal of alcohol; or, by adding the aldehyde at the start of the process, that is, together with the alcoholic nitric acid; or, by reacting the lignin with the aldehyde prior to nitrating. About the same length of time is required to bring about the nitrolignin-aldehyde reaction as is required to produce the nitrolignin. The temperature may be from about 20° to 100° C. After the nitrolignin has reacted with the aldehyde, the alcoholic or other medium is removed by evaporation or filtration and the dried product used for molding.

The nitrolignin-aldehyde condensation product is thermo-setting and may be pressed in hot dies in the usual manner. Insulating board, pressboard, or wallboard may be fabricated from the product to provide especially satisfactory products. The compacted fiber board obtained by nitrating the lignin in situ in sawdust and further reacting with furfural and subjecting the product to heat and pressure is very strong, of dark brown to black color, water resistant, and has a pleasing mottled, smooth surface appearance. Advantageous molding conditions are 300–360° F., 2000 pounds to 5000 pounds per square inch.

The following examples are given as illustrations of the preferred manner of carrying out the invention and should not be construed to limit it in materials, proportions, or scope.

*Example 1.*—Fifty parts of birch sawdust, 300 parts denatured alcohol, 50 parts concentrated (69%) nitric acid, and 20 parts furfural were mixed together, and the suspension boiled under reflux on a steam bath for 3 hours. The mixture was evaporated to dryness, first over a steam bath and finally at 50° C. in an oven. Moldings were made at 343° F., at 3000 and 5000 lb. per sq. in. for 5 minutes. They were homogeneous, dark colored, glazed, and extremely strong. The material was again molded in a cup die at 360° F., 3000 lb. per sq. in., for 20 minutes. The cups were black, strong, and glazed. When immersed in water for 24 hours, the material did not soften or swell appreciably.

*Example 2.*—One hundred parts of birch sawdust, 100 parts concentrated nitric acid (specific gravity 1.42) and 600 parts denatured alcohol were refluxed on a steam bath for 2 hours. The suspension was evaporated to dryness on a steam bath.

The orange colored, granular product was pressed at 343° F., at 3000 lb. per sq. in., for 10 minutes. The molding was slightly soft when hot but cooled to a dark brown, fairly strong, well fused article.

*Example 3.*—Six hundred parts denatured alcohol and 200 parts concentrated nitric acid were mixed and 100 parts redwood flour were added. The suspension was refluxed on a steam bath for 3 hours, then evaporated to dryness at 100° C. The product was molded, and proved to be thermoplastic. When cooled under pressure, a dark brown, well fused and glazed, rather brittle object was obtained.

Fifty parts of this nitrolignin from redwood were suspended in 100 parts 37.5% formalin. Dilute sodium hydroxide was added until the pH was about 8.5. The mixture was refluxed for 1 hour, keeping the pH at 8, then acidified with hydrochloric acid and warmed to coagulate the resinous material. The precipitate was filtered off and dried at 80° C.

The nitrolignin-formaldehyde product was molded at 338° F., 5000 lb. per sq. in., for 5 minutes. The material was thermosetting. The object was fairly strong, homogeneous, and dark brown colored.

*Example 4.*—Fifty parts birch sawdust, 300 parts denatured alcohol, and 50 parts 69% nitric acid were mixed and allowed to stand at room temperature for 16 hours. Twenty parts of furfural were then added, and the whole allowed to stand for 24 hours further. The suspension was evaporated to dryness on a steam bath and the product molded at 360° F., 3000 lb. per sq. in., for 3 minutes. The material was thermosetting. The moldings were black colored, strong, and well formed.

*Example 5.*—Fifty parts birch sawdust, 250 parts ethyl acetate, and 50 parts nitric acid (specific gravity 1.42) were brought to a boil under reflux on a steam bath, and allowed to boil 3 minutes. The orange colored nitrolignin-containing sawdust was filtered off and dried at 80° C. The product was molded at 360° F., 3000 lb. per sq. in. The flow was rather hard, and the moldings were light brown in color.

*Example 6.*—Fifty parts birch sawdust, 10 parts 69% nitric acid, and 300 parts methanol were boiled under reflux for 1 hour, then evaporated to dryness on a steam bath. The nitrolignin-containing sawdust was taken up with 300 parts methanol and further refluxed for 1 hour with 20 parts furfural and 10 parts concentrated nitric acid. The suspension was again evaporated to dryness and molded at 360° F., 3000 lb. per sq. in., for 10 minutes. The flow was fair, and the molding was dark brown in color and thoroughly set up.

This procedure was repeated with isopropanol, n-butanol, mixed pentanols and also with glacial acetic acid. The results were substantially the same, except for the pentanol medium which yielded a much softer flowing material with a much longer curing time.

*Example 7.*—One hundred parts finely ground white pine wood were suspended in 400 parts denatured ethanol, and 100 parts 69% nitric acid were added. The mixture was refluxed on a steam bath for 1 hour, when 40 parts furfural were added and refluxing continued for 1 hour further. The mass was then evaporated to dryness. The light red product was pressed in a sheet die at 320° F., 5000 lb. per sq. in., for 20 minutes to yield a dark brown board of very pleasing mottled appearance.

The products of Examples 1 and 4 were also molded at 338° F., 5000 lb. per sq. in., for 10 minutes in the sheet die to yield strong wallboards of brown mottled, glazed appearance.

*Example 8.*—The procedure of Example 1 was repeated using 50 parts of comminuted newsprint as the lignin-containing material. The resulting product yielded a thermosetting material of rather hard flow; the moldings were dark brown in color.

*Example 9.*—Fifty parts of shredded redwood, 50 parts 69% nitric acid and 200 parts denatured alcohol were boiled under reflux for 1 hour. Twenty parts furfural were added and refluxing continued for 1 hour more. The product was dried at 100° C.

The fibrous powder was molded at 330° F., 3000 lb. per square inch pressure for 5 minutes. The moldings were complete, black, glazed, and quite strong.

*Example 10.*—Example 9 was repeated, using only 10 parts 69% nitric acid and 10 parts furfural. The product was molded at 360° F., 3000 lb. per square inch for 5 minutes. The flow was satisfactory, the moldings being dark brown and strong.

*Example 11.*—One hundred parts of ligneous material comprising spent chestnut sawdust (wet sawdust from which the tannin had been extracted) were added to 400 parts denatured alcohol containing 50 parts 69% nitric acid. The suspension was refluxed 1 hour, 20 parts furfural were added, and the whole refluxed for 2 hours further. The product was evaporated to dryness.

When molded at 330° F., 3000 lb. per square inch for 10 minutes, the moldings were well formed, black, homogeneous, well glazed, and fairly strong.

*Example 12.*—Fifty parts of ground cork, 400 parts alcohol, and 50 parts concentrated nitric acid were boiled under reflux for 2 hours. The suspension was evaporated to dryness.

The dark red product was hot pressed at 350° F., 3000 lb. per square inch for 15 minutes. The flow was soft. The moldings were dark brown colored, thermoplastic and rather elastic or rubbery, especially when hot.

*Example 13.*—Fifty parts of acid lignin (that is, lignin recovered from the black liquor of the sulfate pulping process by precipitation with acid) were dissolved in 200 parts of denatured alcohol containing 20 parts furfural. The solution was refluxed for 1½ hours when 50 parts 69% nitric acid were added. An exothermic reaction took place, after which refluxing was continued for 1 hour. The solution was then mixed with 33 parts of alpha flock and the whole dried.

The powdered product was hot-pressed at 350° F., 3000 pounds per square inch, for 5 minutes. The moldings were strong, well glazed, complete, and of pleasing brown color. The flow of the composition was good.

*Example 14.*—The procedure of Example 13 was repeated using 50 parts of ligninsulfonic acids obtained from waste sulfite liquor instead of the acid lignin. The product was not moldable, the pieces being extremely weak and fragile, sticking to the dies, and remaining water-soluble.

What I claim is:

1. The process of making a molding composition comprising reacting comminuted material selected from the group consisting of woods, grasses, and acid lignin therefrom, with nitric acid dissolved in an alcohol selected from the group consisting of methanol, ethanol and pentanols, and an aldehyde selected from the group consisting of formaldehyde and furfural, and drying the nitrolignin-aldehyde-containing product.

2. The process of making a molding composition comprising reacting comminuted material selected from the group consisting of woods, grasses and acid lignin therefrom, with nitric acid dissolved in an alcohol selected from the group consisting of methanol, ethanol and pentanols, subsequently reacting the nitrolignin-containing material with an aldehyde selected from the group consisting of formaldehyde and furfural, and drying the nitrolignin-aldehyde-containing product thus obtained.

3. The process of making a molding composition comprising reacting comminuted material selected from the group consisting of woods, grasses and acid lignin therefrom, with an ethyl alcohol solution of nitric acid, subsequently reacting the nitrolignin-containing material with an aldehyde selected from the group consisting of formaldehyde and furfural, and drying the nitrolignin-aldehyde-containing products thus obtained.

4. The process of making a molding composition comprising reacting comminuted material selected from the group consisting of woods, grasses and acid lignin therefrom, with an ethyl alcohol solution of nitric acid, subsequently reacting the nitrolignin-containing material with formaldehyde, and drying the nitrolignin-formaldehyde-containing product thus obtained.

5. The process of making a molding composition comprising reacting comminuted material selected from the group consisting of woods, grasses and acid lignin therefrom, with an ethyl alcohol solution of nitric acid, subsequently reacting the nitrolignin-containing material with furfural, and drying the nitrolignin-furfural-containing product thus obtained.

6. The process of making a molding composition comprising reacting comminuted material selected from the group consisting of woods, grasses and acid lignin therefrom, with nitric acid dissolved in an alcohol selected from the group consisting of methanol, ethanol and pentanols, in the presence of an aldehyde selected from the group consisting of formaldehyde and furfural, and drying the nitrolignin-aldehyde-containing product thus obtained.

7. The process of making a molding composition comprising reacting acid lignin with an ethyl alcohol solution of nitric acid, in the presence of an aldehyde selected from the group consisting of formaldehyde and furfural, subsequently adding a cellulosic filler thereto, and drying the nitrolignin-aldehyde-containing product thus obtained.

8. The process of making a molding composition comprising reacting acid lignin with an ethyl alcohol solution of nitric acid, in the presence of furfural, subsequently adding a cellulosic filler thereto, and drying the nitrolignin-furfural-containing product thus obtained.

9. The process of making a molding composition comprising heating acid lignin and furfural in ethyl alcohol solution, reacting nitric acid with said solution, adding a cellulosic filler thereto, and drying the nitrolignin-furfural-containing product thus obtained.

10. A molding composition containing a binder consisting essentially of a nitrolignin-aldehyde reaction product, and a cellulosic filler, said binder being obtained by reacting acid lignin with nitric acid dissolved in an alcohol selected from the group consisting of methanol, ethanol and pentanols, and an aldehyde selected from the group consisting of formaldehyde and furfural.

11. A molding composition containing a binder consisting essentially of a nitrolignin-furfural reaction product, and a cellulosic filler, said binder being obtained by reacting acid lignin with nitric acid dissolved in ethyl alcohol, and furfural.

12. A molding composition containing a binder consisting essentially of a nitrolignin-formaldehyde reaction product, and a cellulosic filler, said binder being obtained by reacting acid lignin with nitric acid dissolved in ethyl alcohol, and formaldehyde.

13. An article comprising essentially the cured molding composition of claim 10.

14. An article comprising essentially the cured molding composition of claim 11.

15. An article comprising essentially the cured molding composition of claim 12.

HARRY BURRELL.